United States Patent
Mitchell et al.

(10) Patent No.: US 10,783,704 B2
(45) Date of Patent: Sep. 22, 2020

(54) DENSE RECONSTRUCTION FOR NARROW BASELINE MOTION OBSERVATIONS

(71) Applicant: Disney Enterprises, Inc., Burbank, CA (US)

(72) Inventors: Kenneth J. Mitchell, Glendale, CA (US); Frederike Dümbgen, Vaud (CH); Shuang Liu, London (GB)

(73) Assignee: Disney Enterprises, Inc., Burbank, CA (US)

( * ) Notice: Subject to any disclaimer, the term of this patent is extended or adjusted under 35 U.S.C. 154(b) by 36 days.

(21) Appl. No.: 16/144,505

(22) Filed: Sep. 27, 2018

(65) Prior Publication Data
US 2020/0105056 A1  Apr. 2, 2020

(51) Int. Cl.
| | | |
|---|---|---|
| G06T 17/10 | (2006.01) | |
| G06T 15/50 | (2011.01) | |
| G06T 7/50 | (2017.01) | |
| G06T 7/246 | (2017.01) | |
| G06N 3/08 | (2006.01) | |

(52) U.S. Cl.
CPC .............. *G06T 17/10* (2013.01); *G06N 3/08* (2013.01); *G06T 7/251* (2017.01); *G06T 7/50* (2017.01); *G06T 15/503* (2013.01); *G06T 2207/30201* (2013.01)

(58) Field of Classification Search
CPC .......... G06T 17/10; G06T 7/50; G06T 7/251; G06T 15/503; G06N 3/08
USPC ...................................................... 345/419
See application file for complete search history.

(56) References Cited

U.S. PATENT DOCUMENTS

| | | | | |
|---|---|---|---|---|
| 2014/0035929 A1* | 2/2014 | Matthews | ............... | G06T 13/40 345/473 |
| 2014/0362091 A1* | 12/2014 | Bouaziz | .................. | G06T 13/40 345/473 |
| 2015/0084950 A1* | 3/2015 | Li | ........................... | G06T 7/251 345/419 |
| 2016/0148425 A1* | 5/2016 | Hwang | .............. | G06K 9/00281 345/419 |
| 2016/0379041 A1* | 12/2016 | Rhee | .................. | G06K 9/00208 382/118 |
| 2017/0069124 A1* | 3/2017 | Tong | ........................ | G06T 13/40 |
| 2017/0256098 A1* | 9/2017 | Yumer | .................... | G06T 19/20 |
| 2018/0033189 A1* | 2/2018 | Ma | ........................ | G06T 15/503 |
| 2018/0197322 A1* | 7/2018 | Sagar | ...................... | G06T 13/00 |
| 2018/0253593 A1* | 9/2018 | Hu | ........................... | G06T 17/00 |

(Continued)

OTHER PUBLICATIONS

H. Javidnia and P. Corcoran, "Accurate depth map estimation from small motions," in IEEE Intl. Conf. on Computer Vision (ICCV), Oct. 2017.*

(Continued)

*Primary Examiner* — Jin Ge
(74) *Attorney, Agent, or Firm* — Patterson + Sheridan, LLP (57) ABSTRACT

Techniques for constructing a three-dimensional model of facial geometry are disclosed. A first three-dimensional model of an object is generated, based on a plurality of captured images of the object. A projected three-dimensional model of the object is determined, based on a plurality of identified blendshapes relating to the object. A second three-dimensional model of the object is generated, based on the first three-dimensional model of the object and the projected three dimensional model of the object.

17 Claims, 9 Drawing Sheets

(56) References Cited

U.S. PATENT DOCUMENTS

2018/0268237 A1* 9/2018 Stanimirovic ....... G06K 9/2018
2018/0342110 A1* 11/2018 Miao ..................... G06T 19/20
2019/0272668 A1* 9/2019 Echevarria Vallespi ....................
G06T 15/02

OTHER PUBLICATIONS

S. Im, H. Ha, G. Choe, H.-G. Jeon, K. Joo, and I. S. Kweon. High quality structure from small motion for rolling shutter cameras. In Proc. IEEE Int. Conf. Comp. Vis., Santiago, Chile, 2015.*

Yasutaka Furukawa and Jean Ponce. Accurate, dense, and robust multiview stereopsis. IEEE transactions on pattern analysis and machine intelligence, 32(8):13621376, 2010.

Fisher Yu and David Gallup. 3d reconstruction from accidental motion. In Proceedings of the IEEE Conference on Computer Vision and Pattern Recognition, pp. 39863993, 2014.

Ha, Hyowon and Im, Sunghoon and Park, Jaesik and Jeon, Hae-Gon and So Kweon, In. High-quality depth from uncalibrated small motionclip. Proceedings of the IEEE Conference on Computer Vision and Pattern Recognition, 2016.

J. P. Lewis, Ken Anjyo, Taehyun Rhee, Mengjie Zhang, Fred Pighin, and Zhigang Deng. 2014. Practice and Theory of Blendshape Facial Models. In Eurographics STAR—State of the Art Report. 20 pages.

Im, et al., "High Quality Structure from Small Motion for Rolling Shutter Cameras," ICCV, 2015, 9 pages.

Zhang et al, "A fast 3D reconstruction system with a low-cost camera accessory," Jun. 9, 2015, Science Reports, 7 pages worts, 7 pages.

* cited by examiner

DENSE RECONSTRUCTION FOR NARROW BASELINE MOTION OBSERVATIONS

BACKGROUND

Field of the Invention

Aspects of the present disclosure relate to reconstruction of a three-dimensional model of an object using two dimensional images, and more specifically, though not exclusively, to reconstruction of dense geometry from small camera or target object movement.

Description of the Related Art

Estimating three-dimensional structures from two dimensional image sequences, sometimes referred to as structure-from-motion, traditionally requires large camera movements with large angle variation. That is, using traditional techniques, a three-dimensional model for a target object can be estimated using a series of two dimensional images of the object, but creation of an accurate three-dimensional model requires large variations in the location of the target object in the two dimensional images. Many digital cameras can capture a series of two dimensional images in a short window of time, for example capturing a burst of frames surrounding the primary image. But traditional structure-from-motion techniques are not suitable for generating an accurate three-dimensional model using these bursts of two dimensional images, because the movement of the camera and the target object is typically very slight (e.g., from accidental movement by the photographer or target), and so the images do not provide the desired large variations in the location of the target object. This can result in high depth uncertainty.

SUMMARY

Embodiments described herein include a method of constructing a three-dimensional model of facial geometry. The method includes generating, using one or more computer processors, a first three-dimensional model of an object based on a plurality of captured images of the object. The method further includes determining, using the one or more computer processors, a projected three-dimensional model of the object based on a plurality of identified blendshapes relating to the object. The method further includes generating, using the one or more computer processors, a second three-dimensional model of the object, based on the first three-dimensional model of the object and the projected three dimensional model of the object.

Embodiments described herein further include a computer program product for constructing a three-dimensional model of facial geometry. The computer program product includes a computer-readable storage medium having computer-readable program code embodied therewith, the computer-readable program code executable by one or more computer processors to perform an operation. The operation includes generating a first three-dimensional model of an object based on a plurality of captured images of the object. The operation further includes determining a projected three-dimensional model of the object based on a plurality of identified blendshapes relating to the object. The operation further includes generating a second three-dimensional model of the object, based on the first three-dimensional model of the object and the projected three dimensional model of the object.

Embodiments described herein further include a processor and a memory storing a program, which, when executed on the processor, performs an operation. The operation includes generating a first three-dimensional model of an object based on a plurality of captured images of the object. The operation further includes determining a projected three-dimensional model of the object based on a plurality of identified blendshapes relating to the object. The operation further includes generating a second three-dimensional model of the object, based on the first three-dimensional model of the object and the projected three dimensional model of the object.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Some techniques reconstruct a three-dimensional model of a static object from a static burst of two dimensional images by matching key points with a strong edge or gradient. For example, these techniques can be used to reconstruct a three-dimensional model from a series of images reflecting narrow baseline motion. These techniques are sometimes suitable for reconstructing static objects, but are often not suitable for reconstructing three-dimensional facial geometry. This is because many facial areas are smooth and texture-less, and so these techniques do not generate an accurate three-dimensional model of the facial geometry. For example, these techniques are often not suitable for generating three-dimensional facial geometry from a series of self-taken images using a camera on a mobile device.

As one example, photographers, and particularly mobile device users, sometimes exhibit shaky movements when taking a picture. This can be referred to as a "shaky cam" effect. This "shaky cam" effect can be used to reconstruct a three-dimensional model of an object, by capturing a series of images from slightly different positions as the photographers hands shake (e.g., images reflecting narrow baseline motion). This is described, for example, in Fisher Yu and David Gallup, 3D *Reconstruction from Accidental Motion*, Proceedings of the IEEE Conference on Computer Vision and Pattern Recognition (2014).

But while these techniques can be adequate for reconstructing a three-dimensional model of some objects in the environment, they are not effective at reconstructing three-dimensional facial geometry. This is because, as discussed above, the facial areas that occupy much of a capture are smooth texture-less surfaces, and so key points cannot be reliably extracted from the images. Further, mobile users capturing a photograph of their own face tend to move both the mobile device camera and their face, sometimes varying their expression while capturing the photograph. This creates a dynamic scene reconstruction problem that can be harder to solve than the static scene problem addressed in Yu et al. and others.

According to one or more embodiments herein, facial geometry priors (e.g., existing datasets of three-dimensional facial models) can be used to improve the three-dimensional model of the target face by imposing constraints on the model and helping to remove interference from unreliable frames. This leads to a more robust method for dense facial reconstruction using narrow baseline motion observations. For example, according to one or more embodiments herein, blendshapes can be used to obtain facial geometry priors and can be used to refine and improve the three-dimensional model. This results in a more accurate and refined three-dimensional model, suitable for a wide variety of applications, including animation, facial recognition, and many others.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the narrow baseline reconstruction module 212, the blendshape reconstruction module 214, the photometric correction module 216, or the machine learning module 218, discussed below in relation to FIG. 2) or related data available in the cloud. For example, these modules could execute on a computing system in the cloud and generate a three-dimensional mesh model of facial geometry using a series of two dimensional images. Doing so allows a user to access this information from any computing system attached to a network connected to the cloud (e.g., the Internet).

Figure 1:
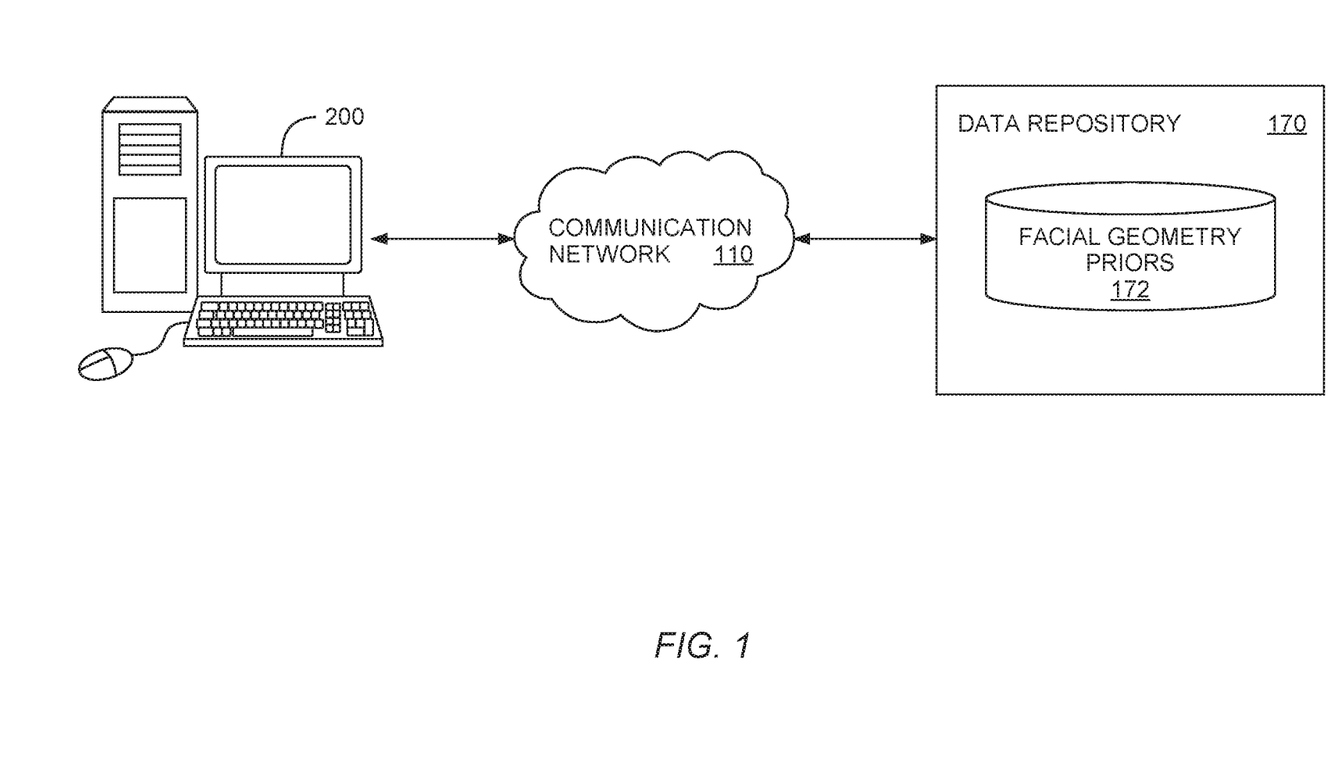
FIG. 1 is a block diagram illustrating generating a three-dimensional model of facial geometry using a series of two dimensional images, according to one embodiment described herein.

FIG. 1 is a block diagram illustrating generating a three-dimensional model of facial geometry using a series of two dimensional images, according to one embodiment described herein. A 3D modeling system 200 is connected to a communication network 110. The 3D modeling system 200 is described in more detail with regard to FIG. 2. The 3D modeling system 200 is generally configured to generate a three-dimensional model of facial geometry using a series of two dimensional images.

The communication network 110 can be any suitable communication network, including the Internet, a local access network, or a wide access network. The communication network 110 can be a wired or wireless network. The communication network can use any suitable communication protocol, including any suitable wireless protocol. For example, the communication network 110 can use an Institute for Electrical and Electronics Engineers (IEEE) Wi-Fi standard, like an 802.11 standard, another Wi-Fi standard, a cellular protocol (including 3G, Long-Term Evolution (LTE), 4G and others), Bluetooth, and others. Further, the communication network 110 can use several different communication protocols.

The communication network 110 is further connected to the data repository 170. The data repository 170 can be any suitable data storage medium. For example, the data repository 170 can include a relational database, or any other suitable database. In an embodiment, the data repository 170 includes network interface software and hardware to allow for communication with the communication network 110. For example, the data repository 170 can include a server computer with a network interface. As another example, the data repository 170 could be included within the 3D modeling system 200. Alternatively, as discussed further below, the data repository 170 could be a cloud-based storage system, accessible via the communication network 110.

The data repository 170 includes data for use by the 3D modeling system 200 in generating a three-dimensional model of facial geometry using a series of two dimensional images. In the illustrated embodiment, the data repository 170 includes facial geometry priors 172. The facial geometry priors 172 can include, for example, blendshapes representing different facial shapes and different facial expressions. In an embodiment, the facial geometry priors 172 can be part of a universal database of facial blendshapes corresponding to a wide variety of different people and models. In another embodiment, the facial geometry priors 172 can be specific to a particular user or group of users. For example, blendshapes corresponding to a particular user could be captured using a performance capture system with that user, and stored as the facial geometry priors 172. The illustrated data in the data repository 170 are merely examples, and other data can also be included.

Figure 2:
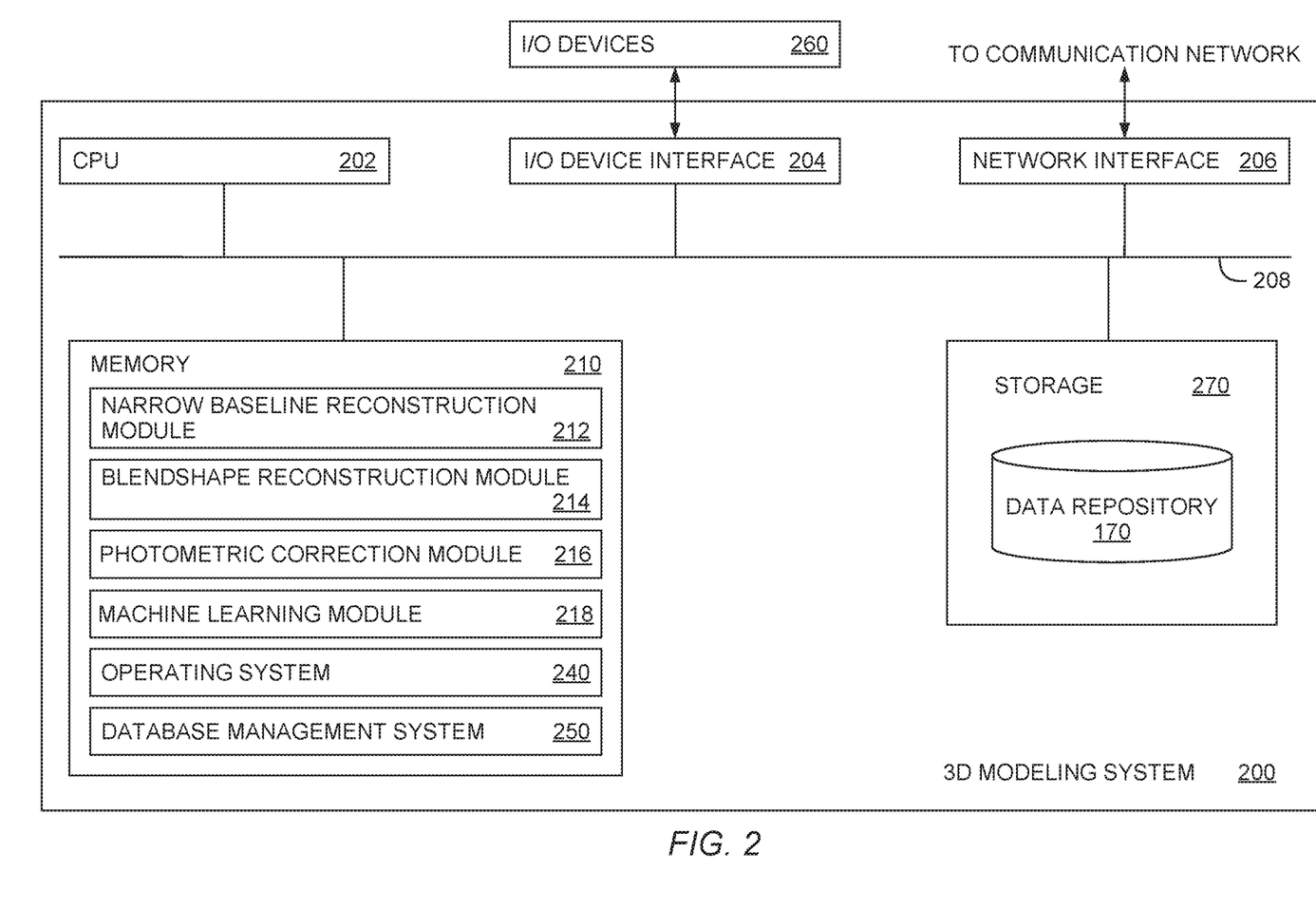
FIG. 2 is a block diagram illustrating a three-dimensional modeling system, according to one embodiment described herein

FIG. 2 is a block diagram illustrating a 3D modeling system 200, according to one embodiment described herein. As shown, the 3D modeling system 200 includes, without limitation, a central processing unit (CPU) 202, a network interface 206, a memory 210, and storage 270, each connected to a bus 208. In an embodiment, the 3D modeling system 200 also includes an Input/Output (I/O) device interface 204 for connecting to I/O devices 260. In an embodiment, the I/O devices 260 can be external I/O devices (e.g., keyboard, display and mouse devices). Alternatively, the I/O devices 260 can be built in I/O devices (e.g., a touch screen display or touchpad). Further, in context of this disclosure, the computing elements shown in the 3D modeling system 200 may correspond to a physical computing system (or may be a virtual computing instance executing within a computing cloud, as discussed further above.

The CPU 202 retrieves and executes programming instructions stored in the memory 210 as well as stores and retrieves application data residing in the storage 270. The bus 208 is used to transmit programming instructions and application data between the CPU 202, the I/O device interface 204, the storage 270, the network interface 206, and the memory 210. The CPU 202 is included to be representative of a CPU, multiple CPUs, a single CPU having multiple processing cores, graphics processing units (GPUs) having multiple execution paths, and the like. The memory 210 is generally included to be representative of electronic storage of any suitable type(s), including random access memory or non-volatile storage. The storage 270 may be a disk drive storage device. Although shown as a single unit, the storage 270 may be a combination of fixed and/or removable storage devices, such as fixed disc drives, removable memory cards, network attached storage (NAS), or a storage area-network (SAN).

Illustratively, the memory 210 includes an operating system 240 and a database management system (DBMS) 250, while the storage 270 includes a data repository 170 (e.g., a database). The operating system 240 generally controls the execution of application programs on the 3D modeling system 200. Examples of operating system 240 include, without limitation, versions of UNIX, distributions of the Linux® operating system, versions of Microsoft® Windows® and so on. The DBMS 250 generally facilitates the capture and analysis of data in the data repository 170 (e.g., facial geometry priors). For instance, the DBMS 250 could enable the definition, creation, querying, update and administration of the data repository 170. As an example, the DBMS 250 could receive a query (e.g., composed using Structured Query Language (SQL)) and, in response, could generate an execution plan that includes one or more access routines to be run against the data repository 170. The DBMS 250 could then execute the access routine(s) and could return any query result data to the requestor.

The memory 210 generally includes program code for performing various functions related to generating the three-dimensional model. The program code is generally described as various functional "applications," "components," or "modules" within the memory 210, although alternate implementations may have different functions and/or combinations of functions. Within the memory 210, the narrow baseline reconstruction module 212 is generally configured to generate a projected three-dimensional mesh model using a series of images with narrow baseline motion. The blendshape reconstruction module 214 is generally configured to generate a projected three-dimensional mesh model using identified blendshapes corresponding to the target image. The photometric correction module 216 is generally configured to refine the narrow baseline reconstruction model generated using the module 212 using the projected model generated using the module 214. The machine learning module 218 is generally configured to train a machine learning model (e.g., a machine learning model stored in the storage 270 or the memory 210) and to use the trained machine learning model in generating the three dimensional model. As illustrated in FIG. 2, the modules 212, 214, and 216 are software modules executed using the CPU 202. Alternatively, each of the modules 212, 214, and 216 could be implemented in hardware.

Figure 3:
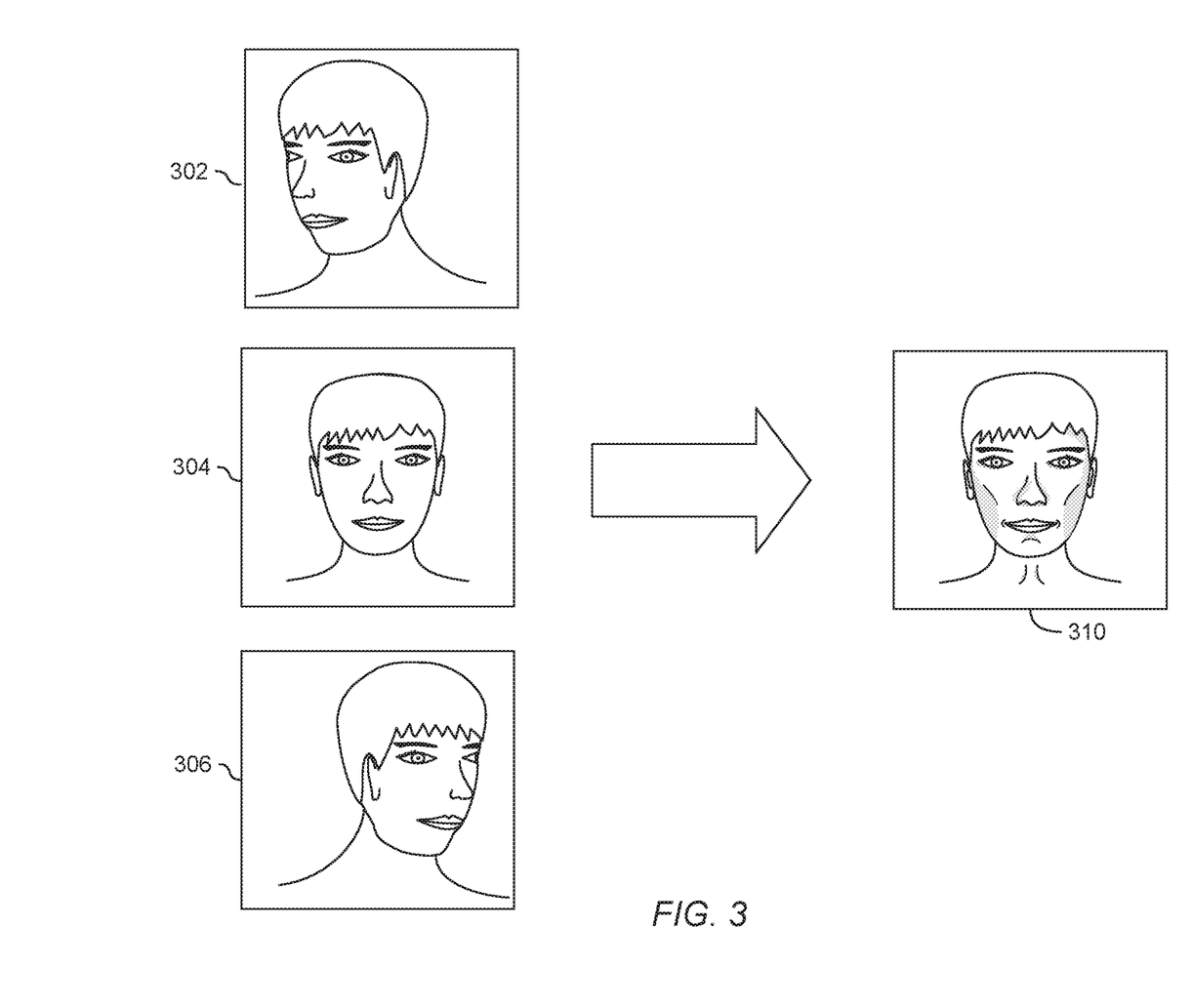
FIG. 3 is a diagram illustrating recreation of a three-dimensional model of facial geometry using a series of two dimensional images, according to one embodiment described herein.

FIG. 3 is a diagram illustrating recreation of a three-dimensional mesh model of facial geometry using a series of two dimensional images, according to one embodiment described herein. For example, images 302, 304, and 306 could be self-taken photographs, taken by a user with a digital camera on his or her mobile computing device and demonstrating shaky camera movement. In this example, the three images 302-306 could be captured rapidly when the user takes the photograph. For example, image 304 could be the photograph taken by the user, image 302 could be an image captured by a digital camera shortly before the image 304 and image 306 could be an image captured shortly after the image 304.

Images 302, 304, and 306 can be captured using any suitable capture device, including any suitable digital camera. In an embodiment, the images 302, 304, and 306 include color information (e.g., RGB data) for each pixel in the image. In another embodiment, the images 302, 304, and 306 further include depth information (e.g., RGB-D data) corresponding to each pixel in the image. If the images 302, 304, and 306 include RGB-D data, this can be useful in generating the three-dimensional mesh model of the target. But in practice, this depth data is often unreliable and must be supplemented with other techniques, as discussed further in relation to the subsequent figures.

The images 302-306 capture motion both by the camera and by the user's face. For example, in the image 302, the user is turned slightly to the side and her face is located toward the side of the frame. In the image 304, the user is facing the camera and her face is in the center of the frame. The camera movement could be because, for example, the user's hand is shaking while holding the camera. In the image 306, the user is again turned slightly to the side and her face is again located to the side of the frame. The camera movement, again, could be because of shaky camera movement. The images 302, 304, and 306 can be used to generate 3D model 310. In an embodiment, the 3D model 310 is a model reconstructing the geometry of the user's face depicted in the images 302, 304, and 306, as described further in FIGS. 4-8.

Figure 4:
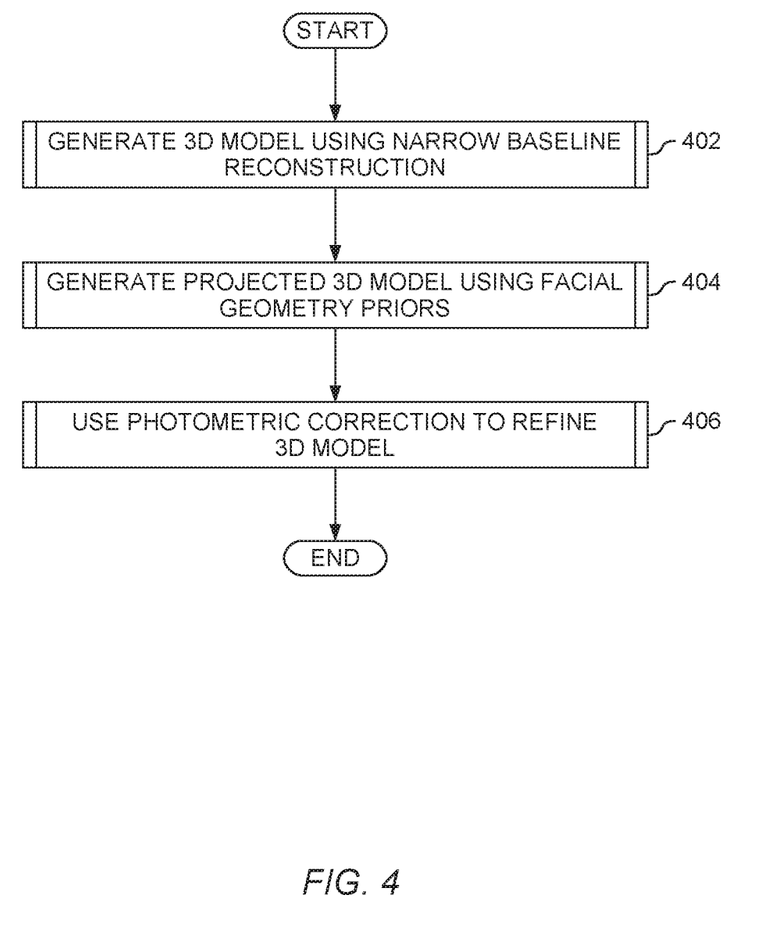
FIG. 4 is a flow chart illustrating generating a three-dimensional model of facial geometry using a series of two dimensional images, according to one embodiment described herein.

FIG. 4 is a flow chart illustrating generating a three-dimensional model of facial geometry using a series of two dimensional images, according to one embodiment described herein. At block 402, a module (e.g., the narrow baseline reconstruction module 212 illustrated in FIG. 2) generates a three-dimensional mesh model of a target face using narrow baseline reconstruction. For example, the narrow baseline reconstruction module 212 can use a series of images of the target face captured using a shaky camera (e.g., images 302, 304, and 306 illustrated in FIG. 3). Block 402 is described in more detail with regard to FIG. 5.

At block 404, a module (e.g., the blendshape reconstruction module 214 illustrated in FIG. 2) generates a projected three-dimensional model of the target face using facial geometry priors. For example, the blendshape reconstruction module 214 can use the facial geometry priors 172 illustrated in FIG. 1. Block 404 is illustrated further with regard to FIG. 5.

At block 406, a software module (e.g., the photometric correction module 216 illustrated in FIG. 2) uses photometric correction to refine the three-dimensional model generated at block 402. For example, the photometric correction module 216 can use the projected model generated at block 404 to correct and refine the model generated at block 402. Block 406 is illustrated further with regard to FIG. 7.

Figure 5:
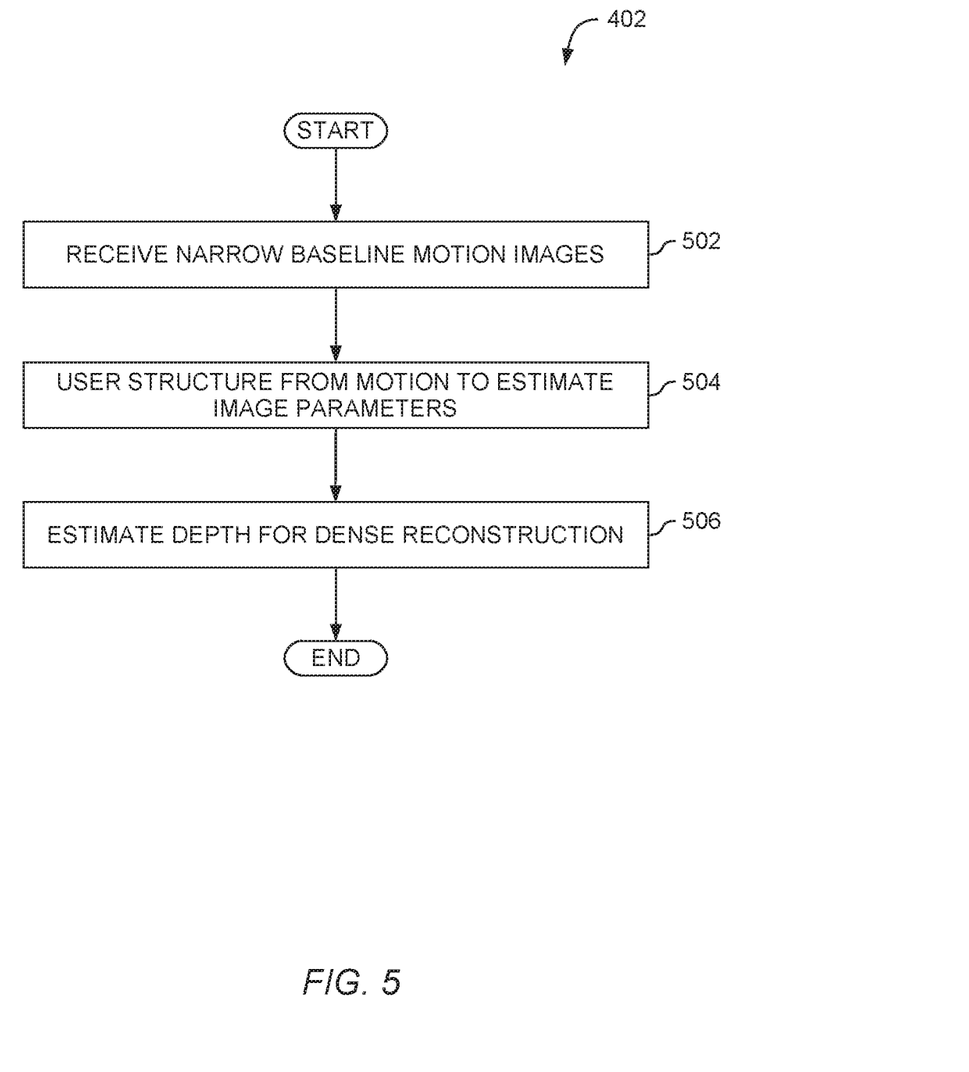
FIG. 5 is a flow chart illustrating generating a three-dimensional model of facial geometry using narrow baseline reconstruction, according to one embodiment described herein.

FIG. 5 is a flow chart illustrating generating a three-dimensional model of facial geometry using narrow baseline reconstruction, according to one embodiment described herein. At block 502, the module (e.g., the narrow baseline reconstruction module 212 illustrated in FIG. 2) receives a series of images depicting narrow baseline motion (e.g., images 302, 304, and 306 illustrated in FIG. 3). These images could be, for example, images arising from accidental movement of a camera when taking a picture. For example, a user taking a picture of his or her face with a camera in a mobile device will often accidentally move the camera (or his or her face) while taking the picture. Multiple images reflecting this motion can be captured, and provided to the narrow baseline reconstruction module 212 at block 502.

Alternatively, the images could arise from intentional motion by the user. For example, an image capture application (e.g., an application on a user's mobile device) could instruct a user to take multiple images while moving the camera. In this example, the image capture application could instruct a user to take a series of pictures while moving the camera in specified ways (e.g., up, down, left, or right) between pictures. This could, for example, facilitate capturing images of the target object (e.g., the user's face) from a series of different angles and perspectives. Further, the image capture application could instruct the user to change his or her facial expression between images (e.g., the application could instruct the user to smile or frown).

In an embodiment, the image capture application could include a user interface to facilitate capturing the images. For example, the image capture application could display a virtual frame on a user interface, and could instruct the user to move the camera until his or her face is centered within the frame. The image capture application could modify the virtual frame between images to encourage the user to move the camera. Further, the image capture application could provide audio or visual instructions to the user. In an embodiment, the image capture application can further include image recognition features to identify whether the user has complied with the instructions (e.g., moved the camera in the correct way to place the user's face within the virtual frame) and is ready to capture the images.

At block 504, the narrow baseline reconstruction module 212 uses structure from motion to estimate parameters relating to each of the captured images. At block 506, the narrow baseline reconstruction module 212 estimates depth maps for dense reconstruction of the face depicted in the captured images, using the estimated parameters generated at block 506. Each of these blocks can be done using any of several known techniques for narrow baseline reconstruction. For example, three papers relate to suitable techniques: (1) Yasutaka Furukawa et al., *Accurate, Dense, and Robust Multiview Stereopsis*, IEEE Transactions on Pattern Analysis and Machine Intelligence, Vol. 32, No. 8 at 1362-1376 (August 2010), (2) Fisher Yu et al., 3D *Reconstruction from Accidental Motion*, Proceedings of the IEEE Conference on Computer Vision and Pattern Recognition at 3986-3993 (2014), and (3) Hyowon Ha et al., *High-quality Depth from Uncalibrated Small Motion Clip*, Proceedings of the IEEE Conference on Computer Vision and Pattern Recognition 5413-5421 (2016). As discussed above, the source images can include only color data or can include color and depth (e.g., RGB-D) data. If depth data is present in the individual images, it can also be used in generating the three-dimensional model.

The techniques illustrated in these prior papers, however, generally rely on matching key points in the various images with strong edges and gradients. This is suitable for some static objects, but it is inadequate for facial reconstruction since many facial areas are smooth and texture-less. Consequently, the three-dimensional mesh model resulting from use of these prior techniques, when used to model a user's face, is likely to be inaccurate and inadequate for further applications. According to certain embodiments herein, the model can be refined using facial geometry priors.

Figure 6:
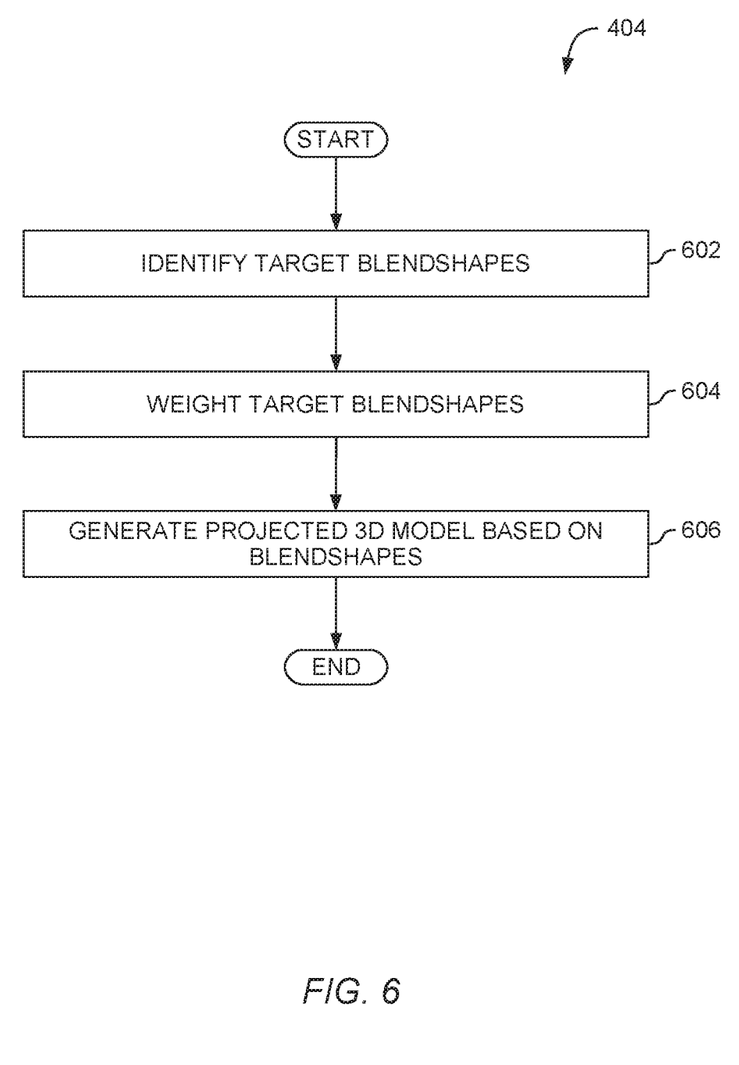
FIG. 6 is a flow chart illustrating generating a projected three-dimensional model of facial geometry using facial geometry priors, according to one embodiment described herein.

FIG. 6 is a flow chart illustrating generating a projected three-dimensional model of facial geometry using facial geometry priors, according to one embodiment described herein. In general, a blendshape model generates a facial pose as a linear combination of a number of facial expressions, sometimes called the "target" blendshapes. A range of facial expressions can be expressed by varying the weights of the linear combination. These blendshapes can come from motion capture of the target, or can be more generic blendshapes captured from other faces similar to the target's face shape and expression. The blendshapes are assigned linear weights, and are combined based on the weights to generate a resulting three-dimensional model. The resulting model, however, tends to be relatively low dimensional and inaccurate.

At block 602, a module (e.g., the blendshape reconstruction module 214 illustrated in FIG. 2) identifies target blendshapes corresponding to the target face. In an embodiment, the target blendshapes can be the facial geometry priors 172 illustrated in FIG. 1. In this embodiment the facial geometry priors 172 can include a database of general blendshapes corresponding to a wide variety of face shapes and facial expressions. Alternatively, the facial geometry priors 172 can include blendshapes captured for the user and specifically relating to the user.

The target blendshapes can be identified using any suitable technique. In an embodiment, a single image (e.g., image 304 illustrated in FIG. 3) can be used to identify the target blendshapes. Alternatively, a series of images (e.g., images 302, 304, and 306 illustrated in FIG. 3) can be used to identify the target blendshapes. Or in a further embodiment, the three-dimensional model generated using narrow baseline reconstruction can be used to identify the target blendshapes.

At block 604, the blendshape reconstruction module 214 weights the identified blendshapes for creation of a three-dimensional model. Again, as discussed above any suitable technique can be used. At block 606, the blendshape reconstruction module 214 uses the weighted blendshapes to generate a projected three-dimensional mesh model of the target's face. Each blendshape represents a particular face shape and facial expression (or a component of a particular face shape and facial expression). The blendshapes are combined, based on their weights, to generate a resulting projected three-dimensional model of the target face. Again, any suitable technique can be used.

Figure 7:
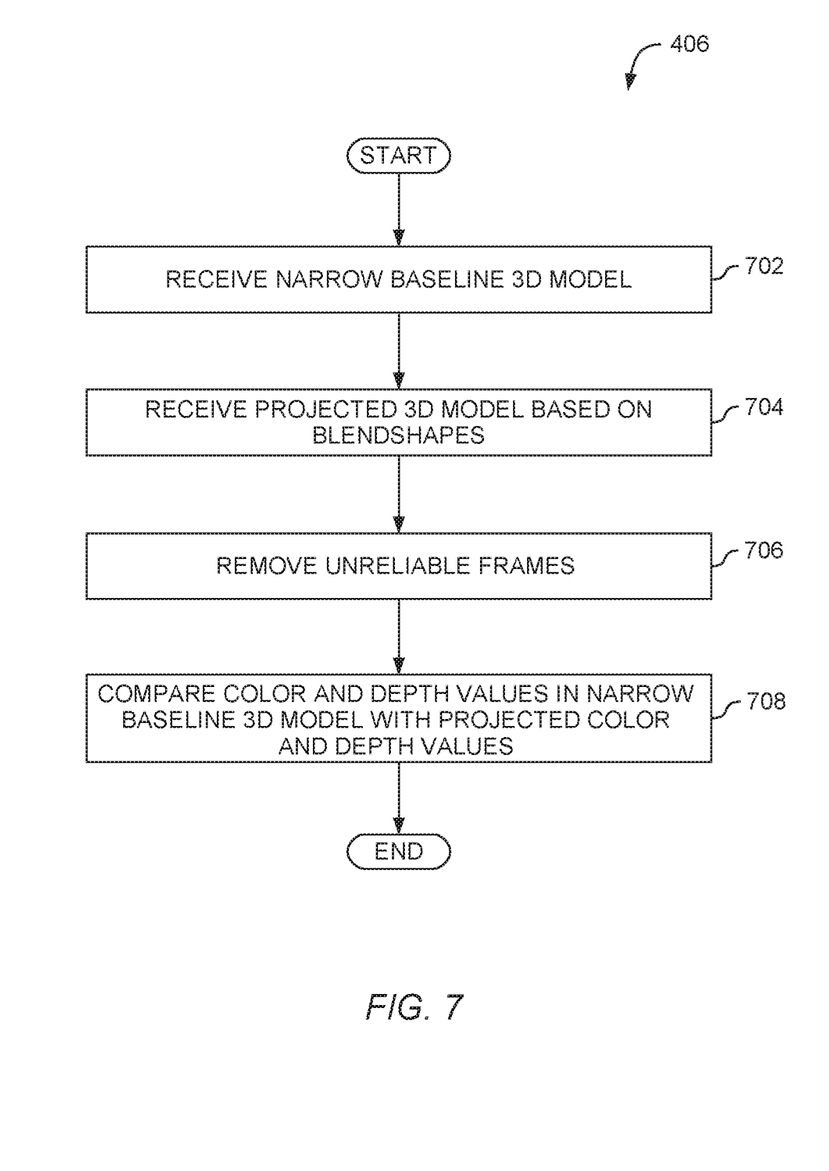
FIG. 7 is a flow chart illustrating refining a three-dimensional model of facial geometry using facial geometry priors, according to one embodiment described herein.

FIG. 7 is a flow chart illustrating refining a three-dimensional model of facial geometry using facial geometry priors, according to one embodiment described herein. At block 702 a module (e.g., the photometric correction module 216 illustrated in FIG. 2) receives the three-dimensional mesh model generated using narrow baseline reconstruction. For example, this can be the model resulting from block 506 discussed above with regard to FIG. 5.

At block 704, the module receives the projected three-dimensional model generated using blendshapes. For example, this can be the model resulting from block 606, discussed above with regard to FIG. 6. At blocks 706 and 708, the blendshape information is used to refine the narrow baseline model to improve its accuracy and resolution.

The blendshape information can be used in a number of different ways. For example, at block 706 the photometric correction module 216 can use the blendshape model to identify unreliable frames in the images used to generate the narrow baseline model, and can discard those frames. In this example, the blendshape model received at block 704 provides a projection of approximate parameters for the target face—if images used to generate the narrow baseline model far outside these projected parameters (e.g., an excessively blurry image or otherwise unreliable image), this source image can be disregarded and the narrow baseline model can be regenerated. This improves the accuracy of the narrow baseline model by removing unreliable source images or frames. This can be used to identify unreliable color information, and to the extent the source images include depth information, the blendshape model can also be used to identify and exclude unreliable depth information.

Another example of how the blendshape model received at block 704 can be used to refine the narrow baseline reconstruction model received at block 702 is illustrated with block 708. At block 708, the photometric correction module 216 uses the blendshape model to constrain the narrow baseline reconstruction model. As one example, the blendshape model can provide a range of expected depth data for a given pixel. This range can be used to constrain the narrow baseline reconstruction model by, for example, removing outlier values or modifying depth values to bring them within the projected range.

As another example, the photometric correction module 216 can use photometric correction to refine the narrow baseline reconstruction model. The photometric correction module 216 can compare the color and depth values for a given point in the narrow baseline reconstruction model with the expected color and depth values in the blendshape model. If these values are different, the photometric correction module 216 can iterate with a solver to bring the values closer together. This can be done using any suitable photometric correction technique.

The blendshape model, and facial geometry priors generally, can also be used for other improvements to the baseline reconstruction model. For example, the facial geometry priors can provide motion constraints when animating a target face. The blendshape model and facial geometry priors provide expected values for a given movement—for example, when a face changes from a neutral expression to a smile, the corners of the mouth are expected to move in particular directions. The blendshape model and facial geometry priors can be used to refine and constrain the narrow baseline reconstruction model. The facial geometry priors can effectively act as both spatial priors (as discussed above), and temporal priors for animation.

As another example, the facial geometry priors can provide improved accuracy for images captured using a rolling shutter. For images captured using a global shutter, it is relatively easy to define the time during which each frame was captured. But for images captured using a rolling shuttle (including many mobile devices), determining the timing of color information is key to reconstructing the three-dimensional color and depth in the mesh model. Use of the facial geometry priors can assist in this process by constraining values and providing projected values.

Figure 8:
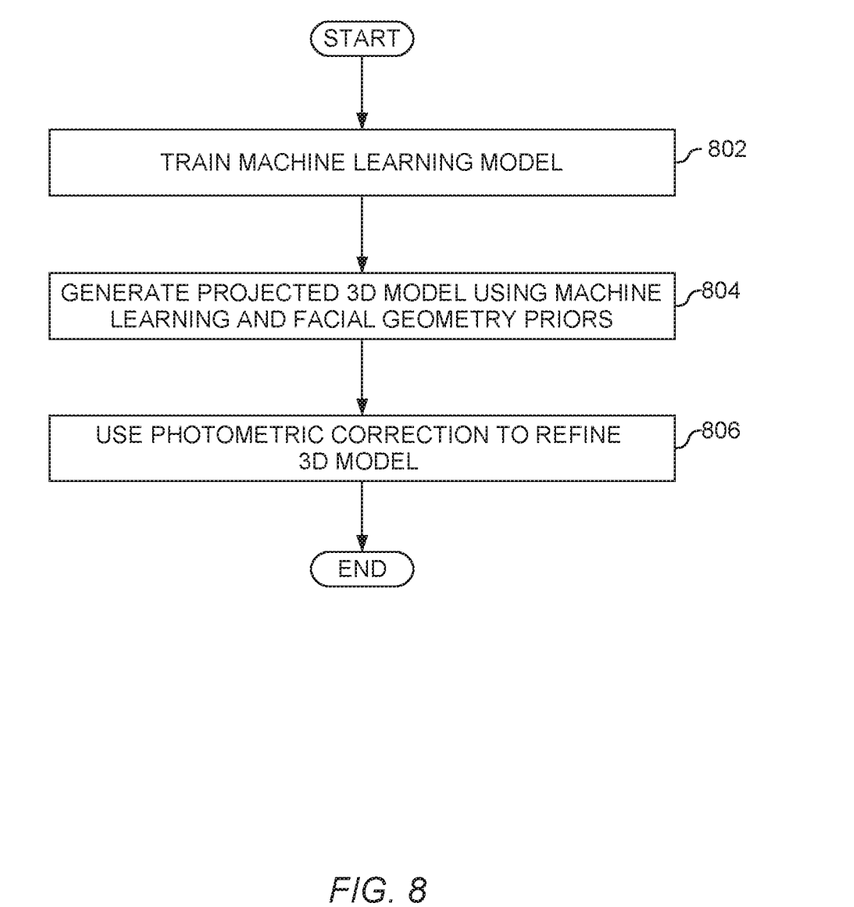
FIG. 8 is a flow chart illustrating use of machine learning techniques in generating a three-dimensional model of facial geometry using a series of two dimensional images, according to one embodiment described herein.

FIG. 8 is a flow chart illustrating use of machine learning techniques in generating a three-dimensional model of facial geometry using a series of two dimensional images, according to one embodiment described herein. In an embodiment, supervised learning is used. At block 802, a machine learning module (e.g., the machine learning module 218 illustrated in FIG. 2) trains one or more machine learning models for use in generating the three dimensional model. The machine learning model can be any suitable machine learning model. In an embodiment, one or more neural networks can be used in the machine learning model. For example, one or more convolutional neural networks could be used. Alternatively, or in addition, one or more recurrent neural network can be used. A recurrent neural network may be particularly suitable for temporal based data. Training the machine learning model is discussed in more detail with regard to FIG. 9.

In an embodiment, two machine learning models can be used. A first machine learning model can be trained to take in a series of images of a scene and to calculate disparity, or three-dimensional, data relating to the scene based on the source images. A second machine learning can be used to synthesize a series of images with generate a three dimensional view, or model, of the scene. In an embodiment, the second machine learning model can use disparity data generated by the first machine learning model in synthesizing the images.

At block 804, a module (e.g., the blendshape reconstruction module 214 illustrated in FIG. 2) generates a projected three-dimensional model of the target face using facial geometry priors. For example, the blendshape reconstruction module 214 can use the facial geometry priors 172 illustrated in FIG. 1. In an embodiment, the machine learning module 218 can be used to supplement the blendshape reconstruction module 214. For example, the machine learning module 218 could also be provided with the blendshapes and its output could be used to constrain, or improve, the output from the blendshape reconstruction module 214. Alternatively, the machine learning module 218 could be provided with blendshapes and used to generate the three-dimensional mesh model end-to-end.

At block 806, a software module (e.g., the photometric correction module 216 illustrated in FIG. 2) uses photometric correction to refine the three-dimensional model generated at block 402. For example, the photometric correction module 216 can use the projected model generated at block 804 to correct and refine a previously generated three-dimensional model. In an embodiment, the machine learning module 218 can be used to supplement, or replace, the photometric correction module 216. For example, the machine learning module 218 could train one or more machine learning modules to take as input an initially generated three-dimensional model and the projected model generated at block 804 and to use the projected model to correct the initial model.

Figure 9:
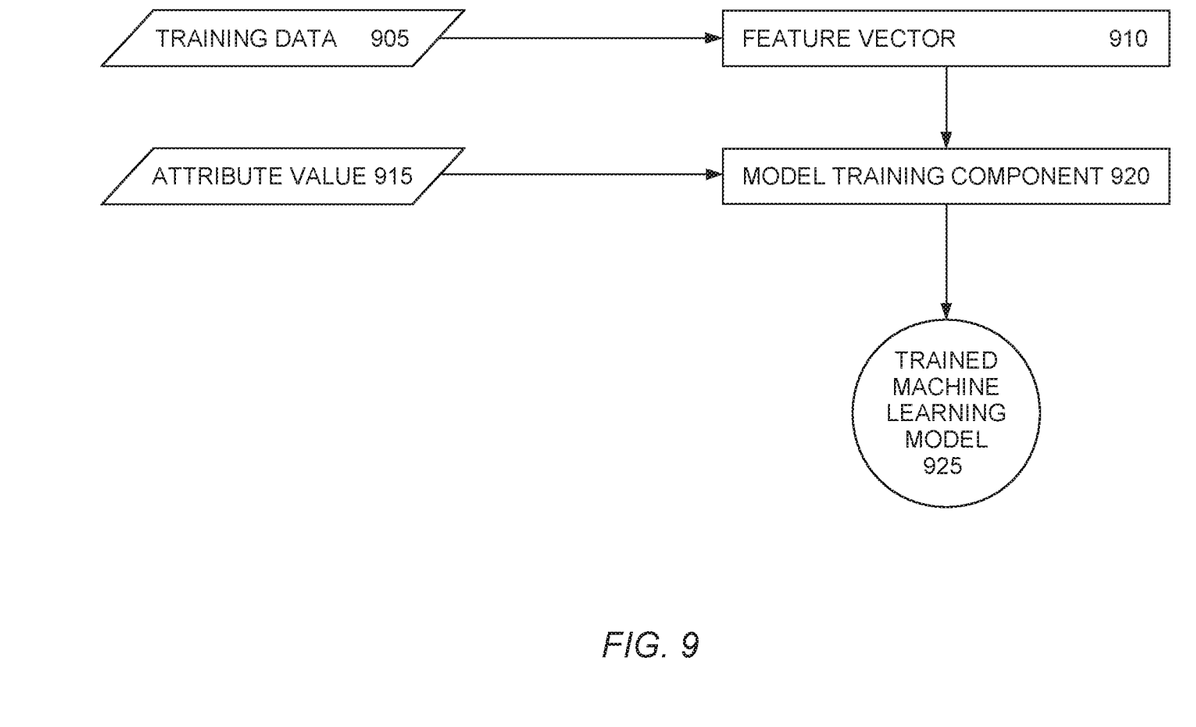
FIG. 9 is a flow chart illustrating training of a machine learning model, according to one embodiment described herein

FIG. 9 illustrates generating and updating a supervised machine learning model, according to an embodiment. As used herein, "trained machine learning" is used interchangeably with "supervised machine learning," and generally refers to machine learning that utilizes exemplars and predetermined attribute scores to train the model. As illustrated, a corpus of training data 905 is converted into feature vectors 910. These feature vectors 910 are provided to a model training component 920, along with a set of associated attribute values 915. That is, the training data 905 is associated with one or more attribute values 915 for the principle attributes used by the system, wherein each of the one or more attribute values 915 represents a measure of an attribute indicated by the corresponding training data 905. The model training component 920 uses supervised machine learning techniques to generate and update a trained machine learning model 925, which can then be used to process new electronic data. Such techniques may include classification and regression techniques, among others. In this way, an updated model can be maintained.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   generating, using one or more computer processors, a first three-dimensional model of an object based on a plurality of captured images of the object;
   determining, using the one or more computer processors, a projected three-dimensional model of the object based on a plurality of identified blendshapes relating to the object;
   identifying one or more unreliable values, relating to at least one of color or depth, in the first three-dimensional model by comparing one or more first values, relating to at least one of color or depth, in the first three-dimensional model with one or more second values, relating to at least one of color or depth, in the projected three-dimensional model; and
   generating, using the one or more computer processors, a second three-dimensional model of the object correcting the first three-dimensional model, by excluding the one or more unreliable values from the first three-dimensional model.

2. The method of claim 1, wherein generating the first three-dimensional model of the object further comprises:
   receiving a plurality of narrow baseline motion captured images of the object; and
   estimating, using the one or more computer processors, image parameters and depth values related to the first three-dimensional model based on analyzing the plurality of narrow baseline motion captured images of the object.

3. The method of claim 1, wherein determining the projected three-dimensional model of the object further comprises:
   identifying, using the one or more computer processors, the plurality of blendshapes related to the object;
   determining, using the one or more computer processors, a weight relating to each of the plurality of identified blendshapes; and
   determining, using the one or more computer processors, the projected three-dimensional model of the object based on the plurality of identified blendshapes and the determined weights.

4. The method of claim 1, wherein generating, using the one or more computer processors, the second three-dimensional model of the object correcting the first three-dimensional model further comprises:
   identifying one or more unreliable captured images in the plurality of captured images of the object; and
   re-generating the first three-dimensional model based on the plurality of captured images, excluding the identified one or more unreliable captured images.

5. The method of claim 1, wherein the unreliable values, the first values, and the second values each relate to color.

6. The method of claim 1, wherein the unreliable values, the first values, and the second values each relate to depth.

7. The method of claim 1, wherein generating the second three-dimensional model of the object is further based on analyzing the plurality of captured images of the object using a trained machine learning model.

8. The method of claim 7, wherein the trained machine learning model comprises a convolutional neural network.

9. The method of claim 1, wherein generating the second three-dimensional model of the object is further based on analyzing the plurality of identified blendshapes using a trained machine learning model.

10. A computer program product comprising:
    a non-transitory computer-readable storage medium having computer-readable program code embodied therewith, the computer-readable program code executable by one or more computer processors to perform an operation, the operation comprising:
       generating a first three-dimensional model of an object based on a plurality of captured images of the object;
       determining a projected three-dimensional model of the object based on a plurality of identified blendshapes relating to the object;
       identifying one or more unreliable values, relating to at least one of color or depth, in the first three-dimensional model by comparing one or more first values, relating to at least one of color or depth, in the first three-dimensional model with one or more second values, relating to at least one of color or depth, in the projected three-dimensional model; and
       generating a second three-dimensional model of the object, correcting the first three-dimensional model, by excluding the one or more unreliable values from the first three-dimensional model.

11. The computer program product of claim 10, wherein generating the first three-dimensional model of the object further comprises:
    receiving a plurality of narrow baseline motion captured images of the object; and
    estimating, using the one or more computer processors, image parameters and depth values related to the first three-dimensional model based on analyzing the plurality of narrow baseline motion captured images of the object.

12. The computer program product of claim 10, wherein determining the projected three-dimensional model of the object further comprises:
    identifying, using the one or more computer processors, the plurality of blendshapes related to the object;
    determining, using the one or more computer processors, a weight relating to each of the plurality of identified blendshapes; and
    determining, using the one or more computer processors, the projected three-dimensional model of the object based on the plurality of identified blendshapes and the determined weights.

13. The computer program product of claim 10, wherein generating the second three-dimensional model of the object, correcting the first three-dimensional model, further comprises:
    identifying one or more unreliable captured images in the plurality of captured images of the object; and
    re-generating the first three-dimensional model based on the plurality of captured images, excluding the identified one or more unreliable captured images.

14. The computer program product of claim 10, wherein the unreliable values, the first values, and the second values each relate to color, and wherein generating the second three-dimensional model of the object, correcting the first three-dimensional model, further comprises:

identifying one or more unreliable depth values relating to the first three-dimensional model by comparing a first one or more depth values relating to the first three-dimensional model with a second one or more depth values relating to the projected three-dimensional model; and excluding the unreliable depth values from the first three-dimensional model.

15. A system, comprising:

a processor; and a memory storing a program, which, when executed on the processor, performs an operation, the operation comprising:

generating a first three-dimensional model of an object based on a plurality of captured images of the object;

determining a projected three-dimensional model of the object based on a plurality of identified blendshapes relating to the object;

identifying one or more unreliable values, relating to at least one of color or depth, in the first three-dimensional model by comparing one or more first values, relating to at least one of color or depth, in the first three-dimensional model with one or more second values, relating to at least one of color or depth, in the projected three-dimensional model; and generating a second three-dimensional model of the object, correcting the first three-dimensional model, by excluding the one or more unreliable values from the first three-dimensional model.

16. The system of claim 15, wherein generating the first three-dimensional model of the object further comprises:

receiving a plurality of narrow baseline motion captured images of the object; and estimating, using the processor, image parameters and depth values related to the first three-dimensional model based on analyzing the plurality of narrow baseline motion captured images of the object.

17. The system of claim 15, wherein determining the projected three-dimensional model of the object further comprises:

identifying, using the processor, the plurality of blendshapes related to the object;

determining, using the processor, a weight relating to each of the plurality of identified blendshapes; and determining, using the processor, the projected three-dimensional model of the object based on the plurality of identified blendshapes and the determined weights.

* * * * *